US008113673B2

(12) United States Patent
Fong

(10) Patent No.: US 8,113,673 B2
(45) Date of Patent: Feb. 14, 2012

(54) PHOTOGRAPHIC DIFFUSER

(76) Inventor: Gary M. Fong, Seattle, WA (US)

( * ) Notice: Subject to any disclaimer, the term of this patent is extended or adjusted under 35 U.S.C. 154(b) by 270 days.

(21) Appl. No.: 12/253,912

(22) Filed: Oct. 17, 2008

(65) Prior Publication Data
US 2009/0129046 A1 May 21, 2009

Related U.S. Application Data

(60) Provisional application No. 60/999,498, filed on Oct. 17, 2007.

(51) Int. Cl.
G03B 15/02 (2006.01)
(52) U.S. Cl. ................... 362/16; 362/17; 362/18
(58) Field of Classification Search ......... 362/16, 362/17, 18
See application file for complete search history.

(56) References Cited

U.S. PATENT DOCUMENTS

| 1,775,180 | A | * | 9/1930 | Worsching ............... 359/611 |
| 3,855,602 | A | | 12/1974 | Hoos |
| 3,939,340 | A | | 2/1976 | Gozzano et al. |
| 4,066,885 | A | | 1/1978 | Weinberg |
| 4,078,170 | A | * | 3/1978 | Sloop ............... 362/322 |
| 4,084,168 | A | | 4/1978 | Pizzuti et al. |
| 4,091,402 | A | | 5/1978 | Siegel |
| 4,146,918 | A | | 3/1979 | Tureck |
| D251,630 | S | | 4/1979 | Larson |
| 4,187,531 | A | * | 2/1980 | Lowell et al. ............ 362/17 |
| 4,251,854 | A | | 2/1981 | Kaneko et al. |
| 4,446,506 | A | | 5/1984 | Larson |
| 4,633,374 | A | | 12/1986 | Waltz et al. |
| 4,757,425 | A | | 7/1988 | Waltz |
| 4,807,089 | A | | 2/1989 | Nüssli |
| D312,471 | S | | 11/1990 | Couch |
| 5,095,325 | A | | 3/1992 | Carstens |
| 5,154,503 | A | | 10/1992 | Sternsher |
| D342,273 | S | | 12/1993 | Couch |
| 5,311,409 | A | | 5/1994 | King |
| 5,406,343 | A | * | 4/1995 | Stephenson ............ 396/174 |
| D373,132 | S | | 8/1996 | Baillie-Hamilton et al. |
| 5,556,186 | A | | 9/1996 | Pilby |
| 5,778,264 | A | * | 7/1998 | Kean ................ 396/174 |
| 5,839,006 | A | | 11/1998 | Beckerman |
| D433,178 | S | | 10/2000 | Donato |
| 6,219,010 | B1 | * | 4/2001 | Chieusse et al. .......... 343/915 |
| 6,234,638 | B1 | * | 5/2001 | Beverly ............... 362/16 |
| 6,644,872 | B2 | * | 11/2003 | Kawazura ............ 396/504 |
| 6,953,259 | B2 | * | 10/2005 | Parsons et al. .......... 362/191 |
| 7,399,097 | B1 | | 7/2008 | DeLaPaz |
| 7,530,701 | B2 | * | 5/2009 | Chan-Wing ............ 362/17 |
| 2007/0245651 | A1 | * | 10/2007 | Hardigg et al. ........... 52/235 |

OTHER PUBLICATIONS

Internet: http://www/lumiquest.com/; LumiQuest The World Leader in Flash Accessories for Digital & Film; © 2005 LumiQuest; .2 sheets.

(Continued)

Primary Examiner — Jong-Suk (James) Lee
Assistant Examiner — Mark Tsidulko
(74) Attorney, Agent, or Firm — Christie, Parker & Hale, LLP

(57) ABSTRACT

A photographic light diffusing device for mounting to a photographic light source includes a base for attaching the photographic light diffusing device to the photographic light source, a semi-transparent hood extending from the base and defining a top edge, and a flap hinged to the top edge of the hood and rotatable with respect to the hood.

18 Claims, 8 Drawing Sheets

OTHER PUBLICATIONS

Internet: http://www.stofen.com/; STO-FEN Products; Oct. 13, 2008; 2 sheets.

Product Pamphlet: Stroboframe Flash Brackets and Accessories; © 1992; 16 sheets.

Product Pamphlet: LumiQuest Photographic Accessories; 3 sheets.

Magazine Article: Sint, S., "Sint's View" Mirror, mirror on the wall, which is the baaaaaddest trade show of them all?, Popular Photography, Feb. 1996, 3 sheets.

Internet: http://www.dembflashdiffusers.com/; Demb Flash Diffuser Pro, © Joe Demb 2006; 2 sheets.

* cited by examiner

PHOTOGRAPHIC DIFFUSER

CROSS-REFERENCE TO RELATED APPLICATION(S)

This application claims priority to and the benefit of U.S. Provisional Patent Application No. 60/999,498, filed on Oct. 17, 2007, the entire contents of which are incorporated herein by reference.

FIELD OF THE INVENTION

The present invention relates to photographic light diffusers.

BACKGROUND

Photographic light diffusers are commonly used to provide soft lighting effects in photographs. To achieve a diffuse lighting effect, light can be either directly or indirectly passed through a semi-transparent material, or it may be reflected off a material which will cause it to scatter somewhat. Such diffuse lighting is commonly produced by light sources which are remote from the camera. Typically, such light diffusers are provided by stationary screens, umbrellas, soft boxes, and the like. Such devices provide excellent lighting effects in fixed studio settings where there is no need to transport the lighting equipment, including the diffusers, from place to place.

Each particular shot to be lighted dictates the type and intensity of light needed to properly illuminate the subject. In some situations, direct light from a light source without any alteration may be required. In other situations, direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers, provided that the equipment is of good quality and is employed in the proper fashion.

While the equipment described above provides good lighting effects in a fixed studio setting, it can be inconvenient, if not impossible, to use such stationary lighting accessories outside of the photography studio. For shoots which require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment. However, known portable diffusers for use with on-camera flashes are less than ideal in terms of the quality of lighting produced. These diffusers tend to create hotspots and may also leave noticeable, undesirable shadows.

SUMMARY OF THE INVENTION

A photographic light diffusing device for mounting to a photographic light source includes a base for attaching the photographic light diffusing device to the photographic light source, a semi-transparent hood extending from the base and defining a top edge, and a flap hinged to the top edge of the hood and rotatable with respect to the hood.

In one embodiment, the base further comprises a plurality of contact arms for attaching the hood to the photographic light source, and each contact arm including a loop for holding the strap. Additionally, the photographic light diffusing device may include a strap configured to extend around the contact arms and the photographic light source.

In one embodiment, the flap is removable, and various flaps may be attachable to the device, each flap having a different size, shape, texture and/or color. Further, the flap may include a reflective surface.

The hood may further comprise a front panel, that may be trapezoidal, and the flap may be configured to fold against the front panel such that the photographic light diffusing device may be folded into a generally flat position. Additionally, the hood and/or the flap may define a plurality of integral ribs.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the figures and description are to be regarded as illustrative in nature, rather than restrictive.

Embodiments of the present photographic flash diffuser provides high quality lighting effects when used with on-camera flashes, allowing photographers to achieve studio-quality lighting using electronic on-camera flashes without the need for separate lighting equipment. By doing so, embodiments of the present diffuser eliminate the need to transport and use cumbersome lighting equipment such as brackets, umbrellas, soft boxes, and the like, allowing for truly mobile, spontaneous photography.

Figure 1:
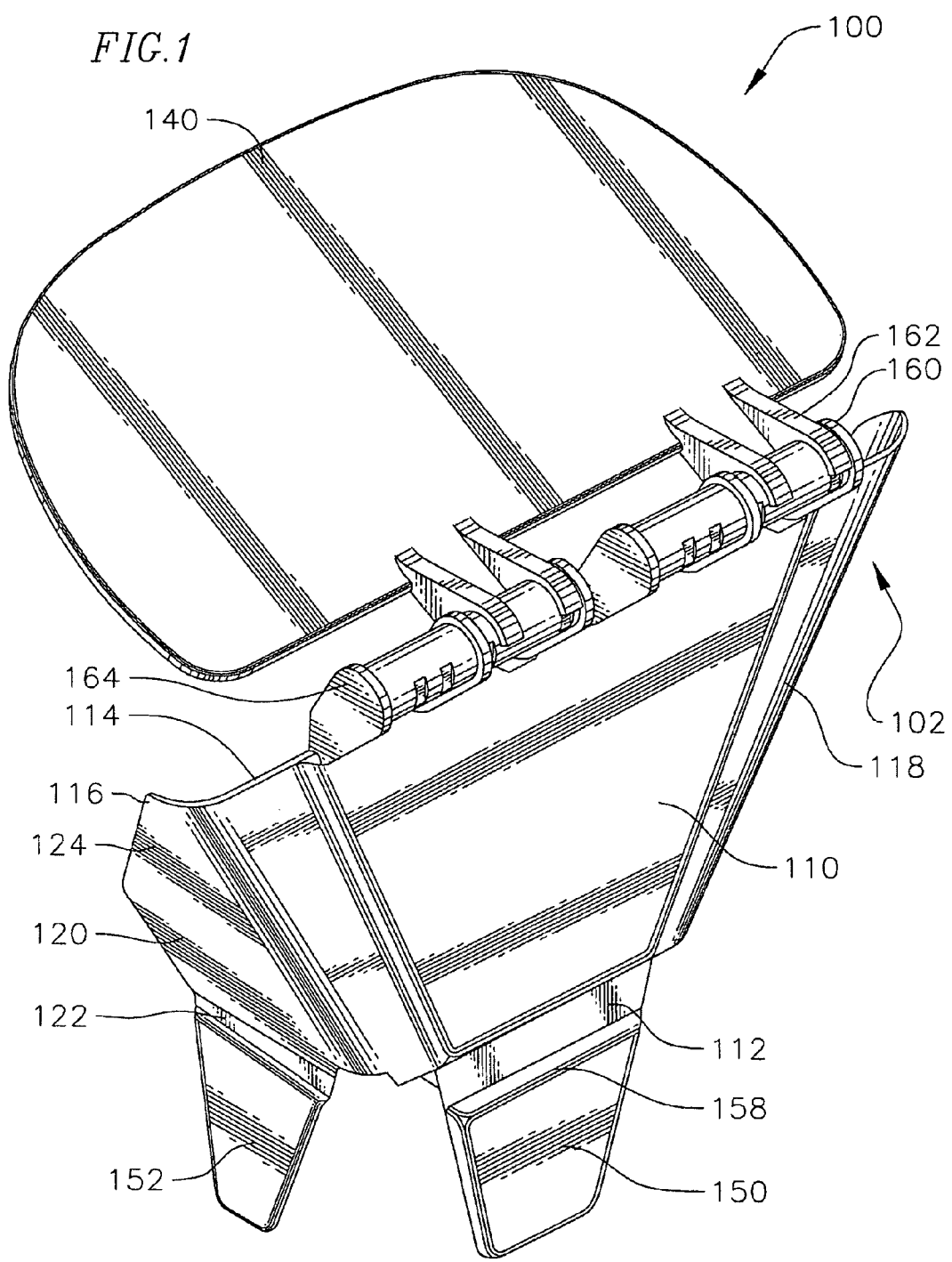
FIG. 1 shows a perspective view of a photographic light diffuser according to one embodiment of the present invention.

FIG. 1 shows a perspective view of a photographic light diffuser 100 according to one embodiment of the present invention. The general shape of the diffuser 100 may be described as that of a three-sided hood with an open top. The diffuser 100 may, in one embodiment, be formed from thermoplastic materials using well-known vacuum molding processes. The diffuser 100 may also be made from other well-known plastic forming processes, as well as being formed from other appropriate semi-transparent or translucent materials, as will be understood by one skilled in the art. The mold surface may be roughened to provide the diffuser 100 with a semi-transparent or translucent finish, allowing for greater dispersion of light through the diffuser 100. Such a roughened surface may be created by treating the mold with a sand or bead blasting process.

As shown in the embodiment of FIGS. 1-6, the diffuser 100 is provided having two component parts; a hood 102 and a flap 140. In one embodiment, the hood 102 is provided with a generally rectangular base comprising three contact arms 150, 152, and 154 allowing the diffuser 100 to attach directly to the head of an on-camera flash. In one embodiment, the contact arms 150, 152, and 154 may be friction fitted to the head of the on-camera flash. In alternative embodiments, the diffuser 100 may be mounted on the flash using a bracket permanently or removably attached to the flash, or it may be mounted using a threaded collar, a bayonet style mount, or hook-and-loop fasteners such as VELCRO. According to one embodiment, an elastic fastening band 155 further secures the diffuser to the flash.

Figure 7:
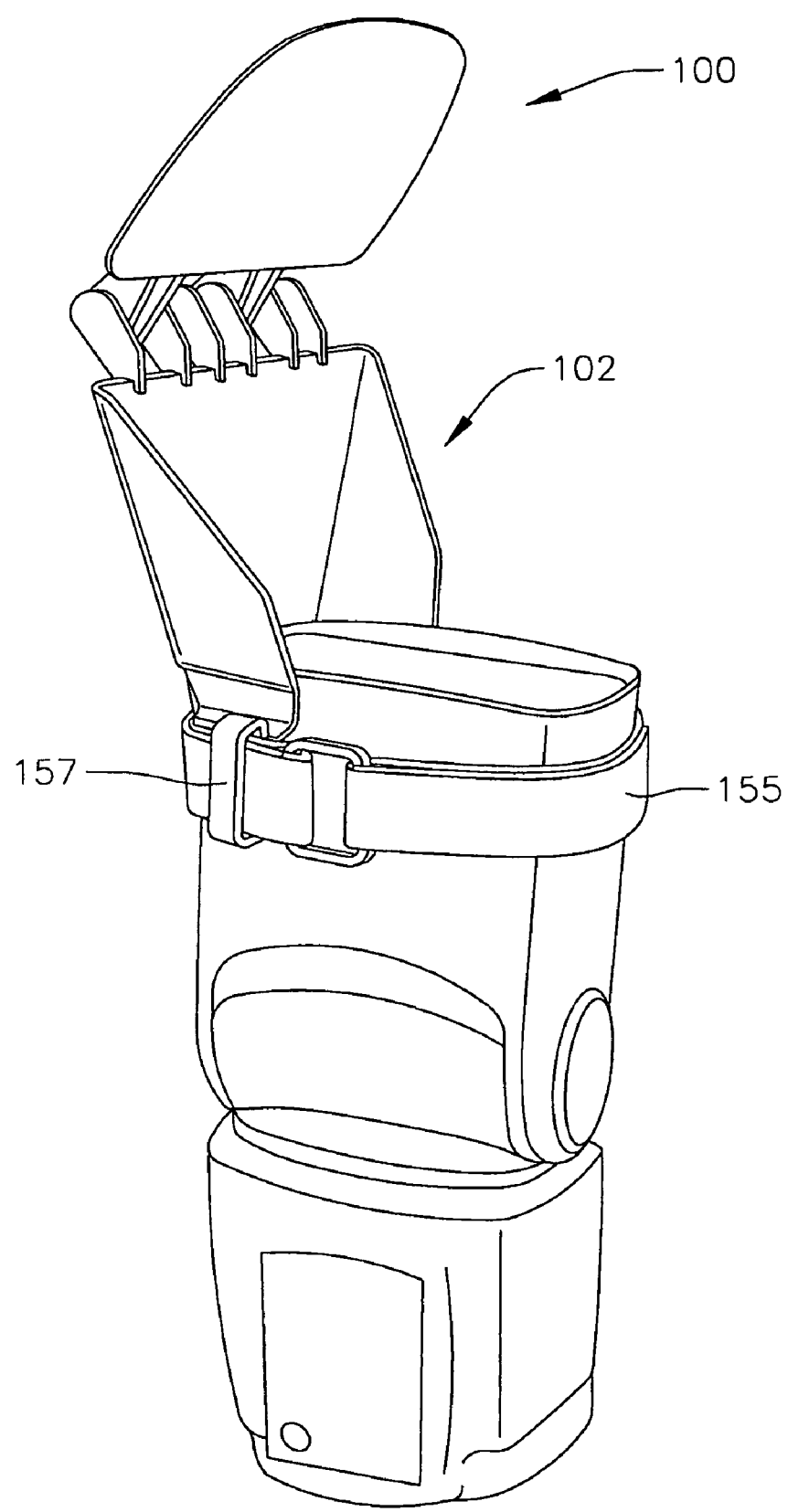
FIG. 7 shows a perspective view of a photographic light diffuser according to one embodiment of the present invention.
Figure 8:
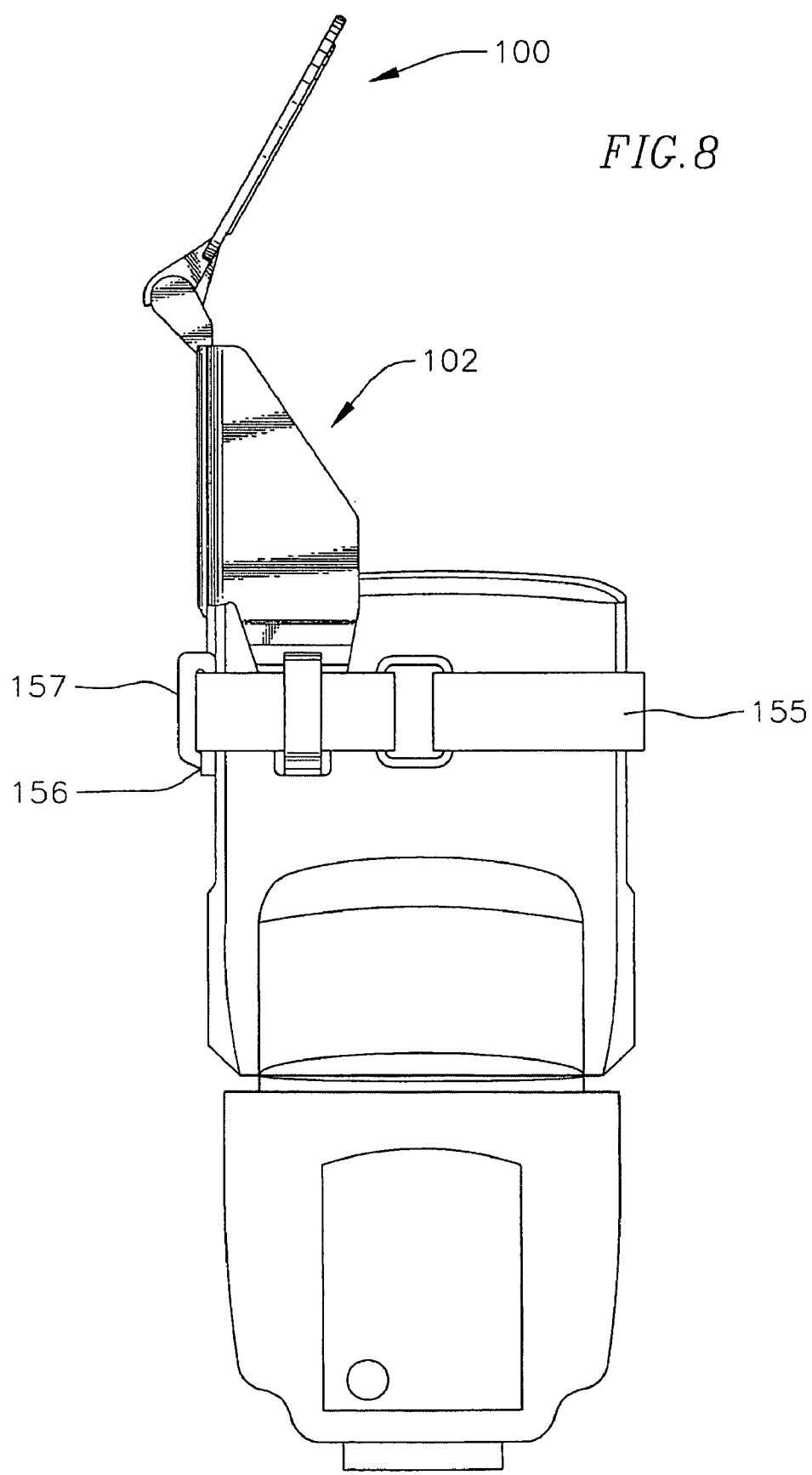
FIG. 8 shows a side view of a photographic light diffuser according to one embodiment of the present invention.

More specifically, as shows in FIGS. 7 and 8, an elastic fastening band 155 may be used to secure the diffuser 100 to a flash by stretching the fastening band 155 over the contact arms 150, 152, and 154. The elasticity of the fastening band 155 will press the flexible contact arms 150, 152, and 154 against the faces of the flash, while the fastening band 155 stretches against the flash as well. Such an elastic fastening band may be made of an elastomeric compound such as rubber, or an elastic fabric band may be used. In still another embodiment, a fabric strap may be used as a fastening band that is fastened to itself using a buckle assembly, hook-and-loop fasteners, or various other assemblies well know for fastening belts or straps.

In other embodiments shown in FIGS. 7 and 8, the lower ends of the contact arms 150, 152, and 154 may include ridges 156 which prevent the fastening band 155 from sliding off and/or one or more of the contact arms 150, 152, and 154 may include a loop 157 through which the fastening band 155 can be inserted in order to more securely attach the diffuser 100 to a flash.

Returning now to FIGS. 1-6, in an embodiment of the diffuser 100 is shown wherein the hood 102 includes a front panel 110 and left and right side panels 120 and 130.

An embodiment of the front panel 110 has a bottom edge 112 configured to be substantially equal in length to an edge of a photographic light source, a top edge 114 substantially parallel to the bottom edge, a left side edge 116, and a right side edge 118. As shown in FIGS. 1-6, an embodiment of the front panel 110 has a trapezoidal shape and an approximately uniform thickness. However, the front panel 110 may be formed in other shapes and varying thicknesses in order to achieve desired diffusivities of a light source, as would be understood by one skilled in the art.

An embodiment of the left panel 120 includes a bottom edge 122 substantially coplanar and substantially perpendicular to the bottom edge 112 of the front panel 110, and a side edge substantially colinear with the left side edge 116 of the front panel 110. According to this embodiment, the left panel 120 is integrally attached to the front panel 110 at the left side edge 116. Additionally, the left panel 120 has an upper edge 124 which tapers downward toward the bottom edge 122 in a direction moving away from the left side edge 116.

An embodiment of the right panel 130 includes a bottom edge 132 substantially coplanar and substantially perpendicular to the bottom edge 112 of the front panel 110, and a side edge substantially colinear with the right side edge 118 of the front panel 110. According to this embodiment, the right panel 130 is integrally attached to the front panel 110 at the right side edge 118. Similar to the left panel 120, the right panel 130 has an upper edge 134 which tapers downward toward the bottom edge 132 in a direction moving away from the right side edge 118.

The right panel 130 is substantially equal in size and substantially symmetric to the left panel 120. The left and right panels 120, 130 are positioned opposite each other.

To facilitate fabrication by a molding process and improve the strength of the hood 102, the edges 116 and 118, where the front panel 110 is attached to the left and right panels 120, 130, respectively, may be rounded fillets, rather than true abrupt edges.

The lighting properties of the diffuser 100 can be varied by varying the relative proportions of the diffuser 100. Most importantly, the length of the top edge 114 of the front panel 110, the angle of the front panel 110, the lengths of the bottom edges 122, 132 of the left and right panels 120, 130, and the angles of taper of the upper edges 124, 134 of the left and right panels 120, 130 will each affect the lighting properties of the diffuser 100.

While the purpose of the diffuser 100 is to ameliorate the harsh effects of direct lighting, some amount of direct light, or "key light" is desirable to provide an amount of specularity in an exposed image. The higher intensity gives a catchlight to the eyes of photographic subjects and prevents the image from appearing too soft. The geometry of the diffuser 100 is designed to strike a balance between an image that is too harsh and one that is too soft.

Referring to the diffuser 100 of FIGS. 1-6, in an embodiment the contact arms 150, 152, and 154 extend past a minimum length of about one inch to permit the diffuser 100 to fit over a flash. The contact arms 150, 152, and 154 are attached to the front, left, and right panels 110, 120, and 130, at the bottom edges 112, 122, and 132, respectively. The contact arms 150, 152, and 154 are positioned in an orientation so as to provide a generally rectangular base for the diffuser 100 to engage with a generally rectangular flash through which light from the flash travels.

Figure 6:
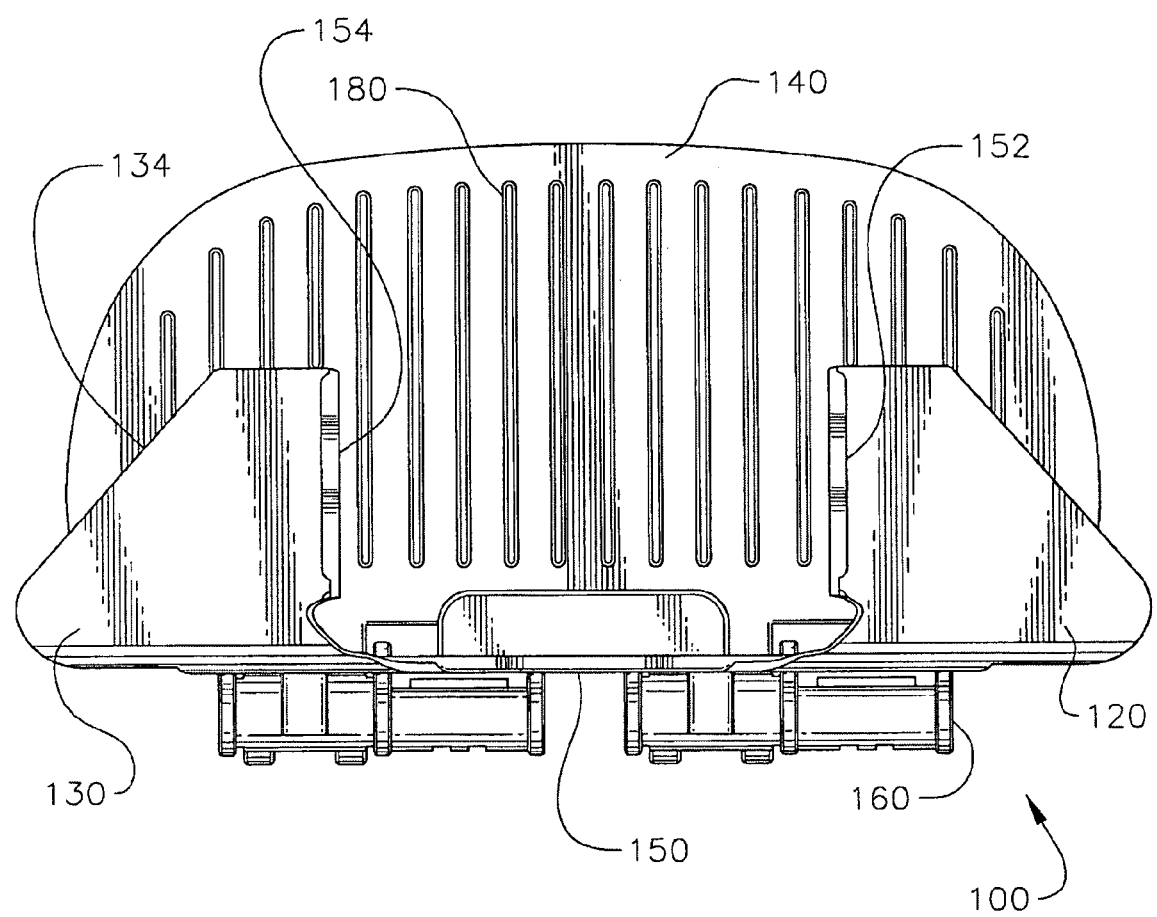
FIG. 6 shows a bottom view of the photographic light diffuser of FIG. 1.

FIG. 6 shows a bottom view of the diffuser 100. FIG. 6 illustrates that a generally rectangular base may be provided with contact arms 150, 152, and 154 to create a basal socket of specific interior dimensions in order to match the exterior dimensions of standard camera flashes. This particular embodiment of a basal socket is designed to be friction fit to a Canon 580EX flash. Because the contact arms 150, 152, and 154 are flexible, other flashes of similar dimensions may be used with a fastening band 155, as previously described in connection with FIGS. 7-8, to secure the contact arms 150, 152, and 154 to the flash. In one embodiment, as shown in FIG. 1, the contact arms each include a thin wall section 158 which acts as a spring to allow a larger flash to be used, while still maintaining a tight grip with a smaller flash. Such a thin wall section 158 may be formed in any or all of the contact arms 150, 152, and 154. Additionally, other basal sockets may be configured for a friction fit with other models of camera flashes.

Referring to the embodiment of FIGS. 1-6, the diffuser 100 is provided with a hinged flap 140 which may be removably attached to the front panel 110, and rotated with respect to the top edge 114 of the front panel 110, so that the diffuser 100 can be used to provide a more or less diffuse lighting effect. The flap 140 is easily removable and interchangeable in order to substitute a flap 140 with a different diffusivity, reflectivity, or other varying properties.

In the embodiment of FIGS. 1-6, the flap 140 is connected to the top edge 114 of the front panel 110 using one or more hinge mechanisms 160. FIG. 1 shows a photographic light diffuser 100 with one embodiment of a snap-on hinge mechanism 160 for connecting the flap 140 to the hood 102, wherein the flap 140 is provided with a bar 162 which fits over a snap ridge clip 164 on the front panel 110. These bars 162 and clips 164 are molded into the flap 140 and front panel 110, respectively, but the flap 140 may be attached using other methods known to those skilled in the art. Such a hinge assembly allows easy removal of the flap while still holding it securely to the hood.

In one embodiment, the diffuser 100 is proportioned so that it is easy to pack and transport in that it may be placed over a camera lens when packed together with a camera in a standard camera bag, thus saving space. For example, the flap 140 may be rotated such that it is flat against the front panel 110, and the front panel 110 may be placed flat, directly over the lens of the camera.

When shooting in environments with high ceilings, the diffuser 100 may be employed with the flap 140 removed or in a position such that it does not interfere with the light exiting the top of the hood 102. In one embodiment, the flap 140 may be folded flat against the front panel 110 or removed in order to allow light energy from the flash to shine upward and reflect off the ceiling. Due to the shape and orientation of the hood 102, enough light strikes the front panel 110 and the left and right panels 120, 130 to cast some amount of light forward onto the subject even without employing the flap 140. This gives a suitable lighting ratio for shots taken using the diffuser 100, reducing shadows on the subject and giving a diffuse, soft light all around the room as well as on the subject. For large group shots, the lighting quality is soft, beautiful, and diffuse. The open top allows a great deal of light to bounce off the ceiling onto the subject yielding a natural lighting effect.

The flap 140 may be used for indoor environments with low ceilings where reflected light from the ceiling would cast harsh shadows on the subject. In one embodiment, the flap 140 acts as a diffusion device to spread light evenly all around the room, lighting the subject as well as brightening dark backgrounds and ceilings. The flap 140 may snap directly onto the hood 102 of the diffuser 100 to accomplish this diffusion. Through the employment of the flap 140 with the diffuser 100 for use with low ceilings, studio-quality lighting using a flash can be achieved with a portable photography platform.

In one embodiment, when it is desirable to directly light a subject, it is not necessary to remove the entire diffuser 100 from the flash of the camera. The flap 140 may be moved to a position flat against the front panel 110, and the flash pointed directly at the subject through the open top of the hood 102, while the diffuser 100 remains attached to the camera to easily and directly illuminate the subject.

On occasion, photographers may want the reflected light in their shots to have a particular color quality. This can be provided with alternative embodiments of the present diffuser 100 wherein the material of the entire diffuser 100, or specific portions of the diffuser 100, such as the hood 102 or the flap 140 has a particular hue. For example, the flap 140 can be made amber for inside shots to provide warmer skin tones and for overall warming in flash-filled available light shots, or green for shots where there is much fluorescent lighting. In other embodiments, combinations of colors may be used, for example, a white hood may be combined with an amber flap. In still another embodiment, the flap 140 may include a reflective surface to bounce a portion of the light in various directions such as away from or toward the front panel of the hood.

Figure 2:
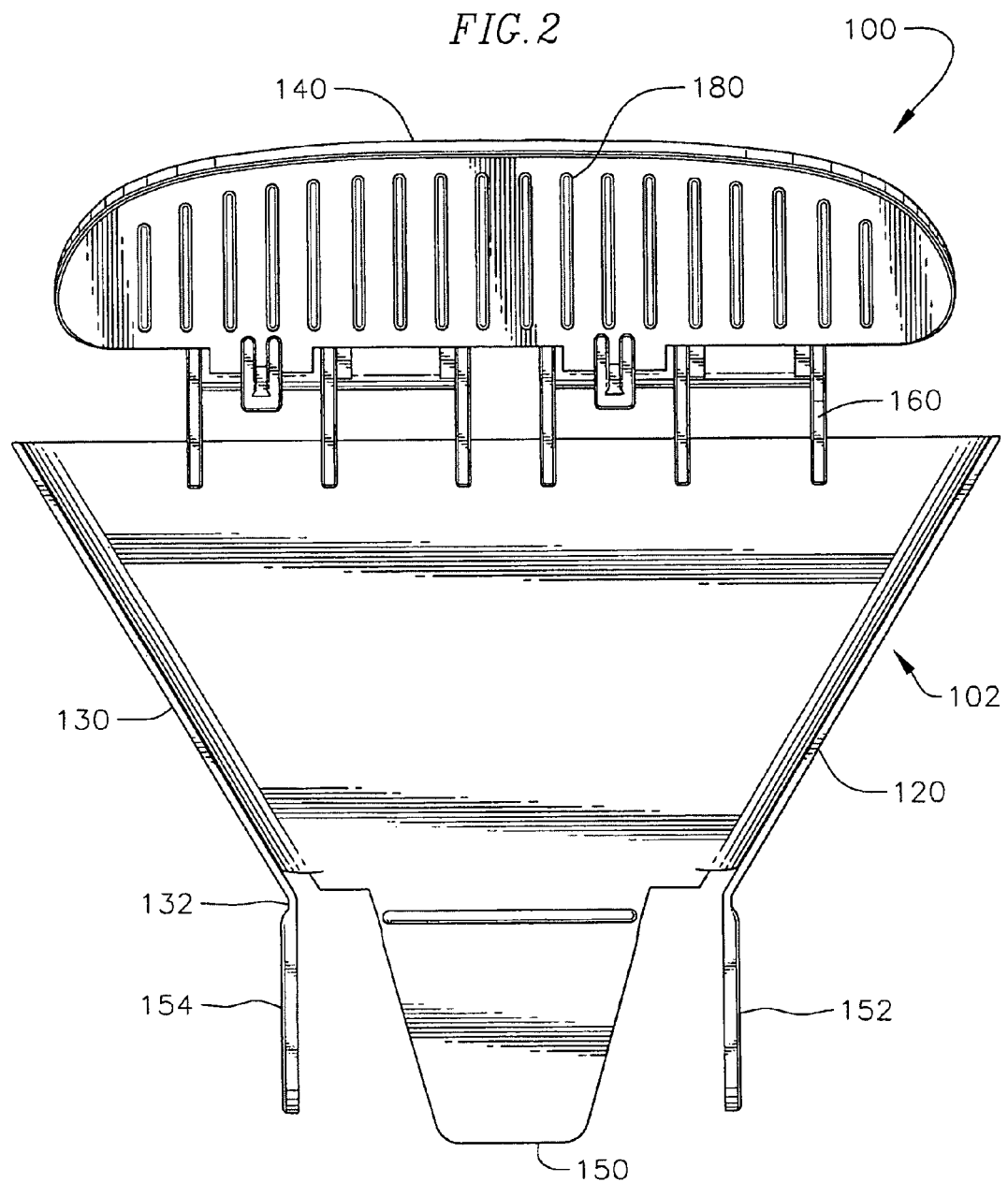
FIG. 2 shows a front view of the photographic light diffuser of FIG. 1.
Figure 3:
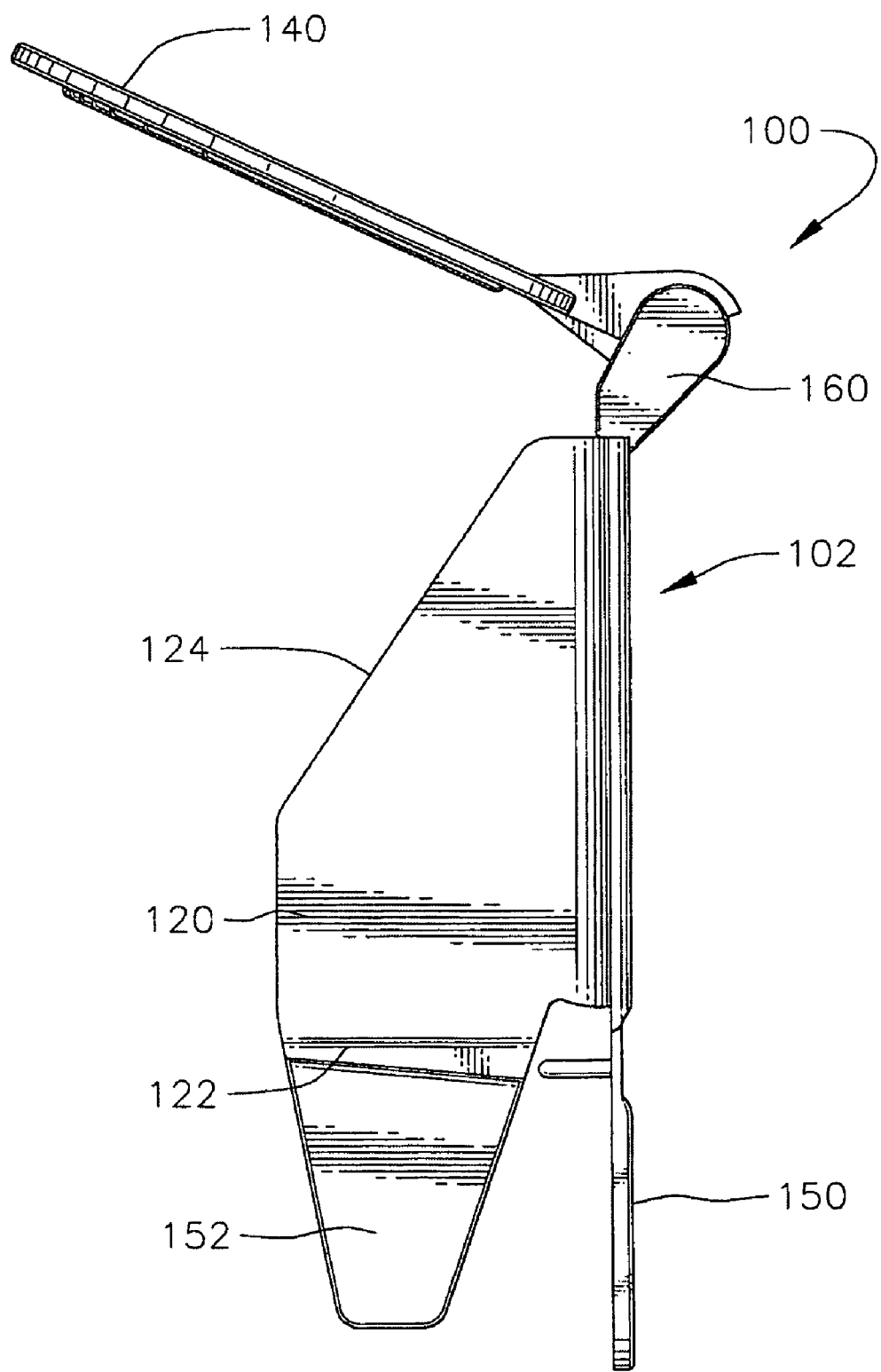
FIG. 3 shows a side view of the photographic light diffuser of FIG. 1.
Figure 4:
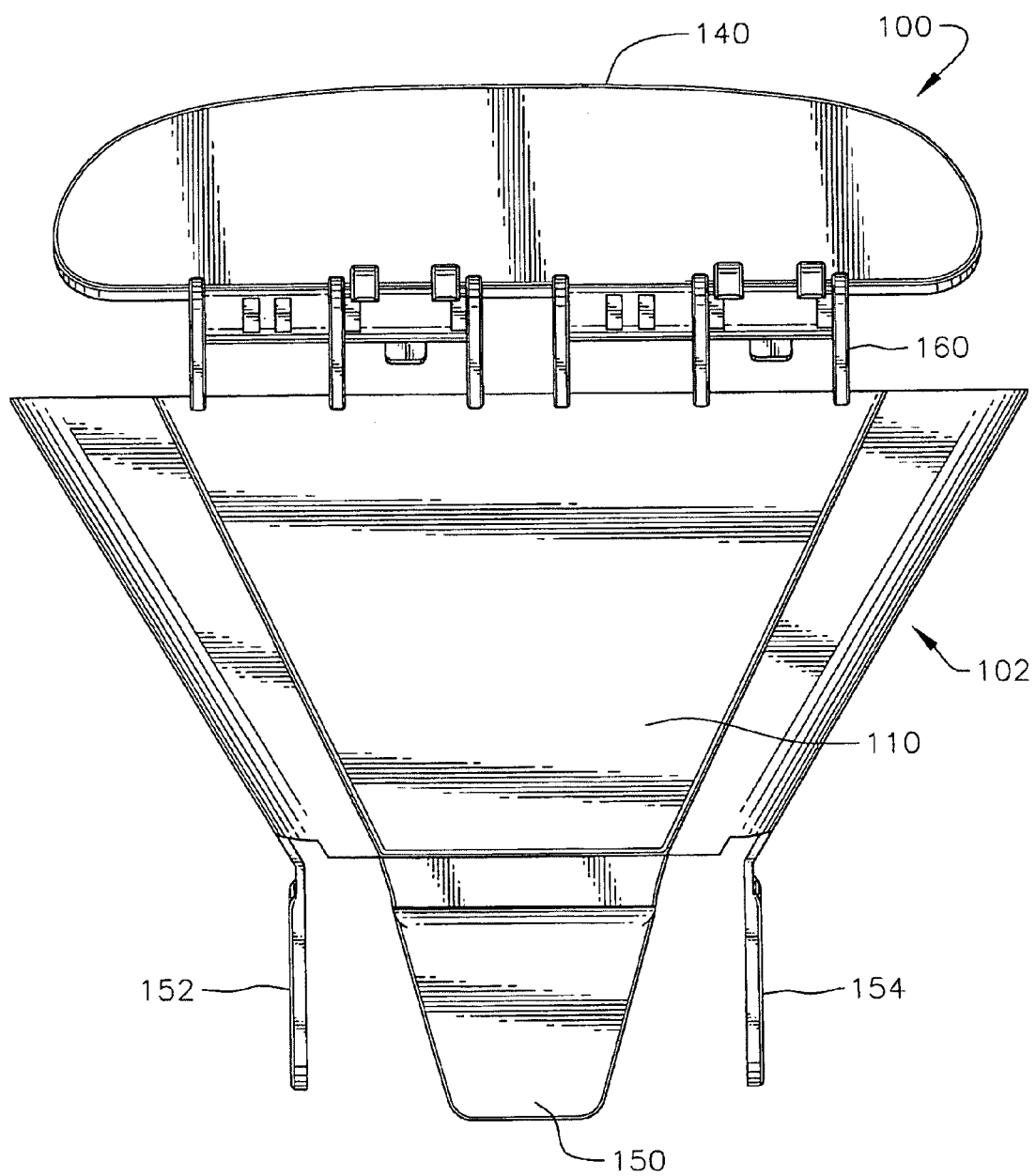
FIG. 4 shows a rear view of the photographic light diffuser of FIG. 1.
Figure 5:
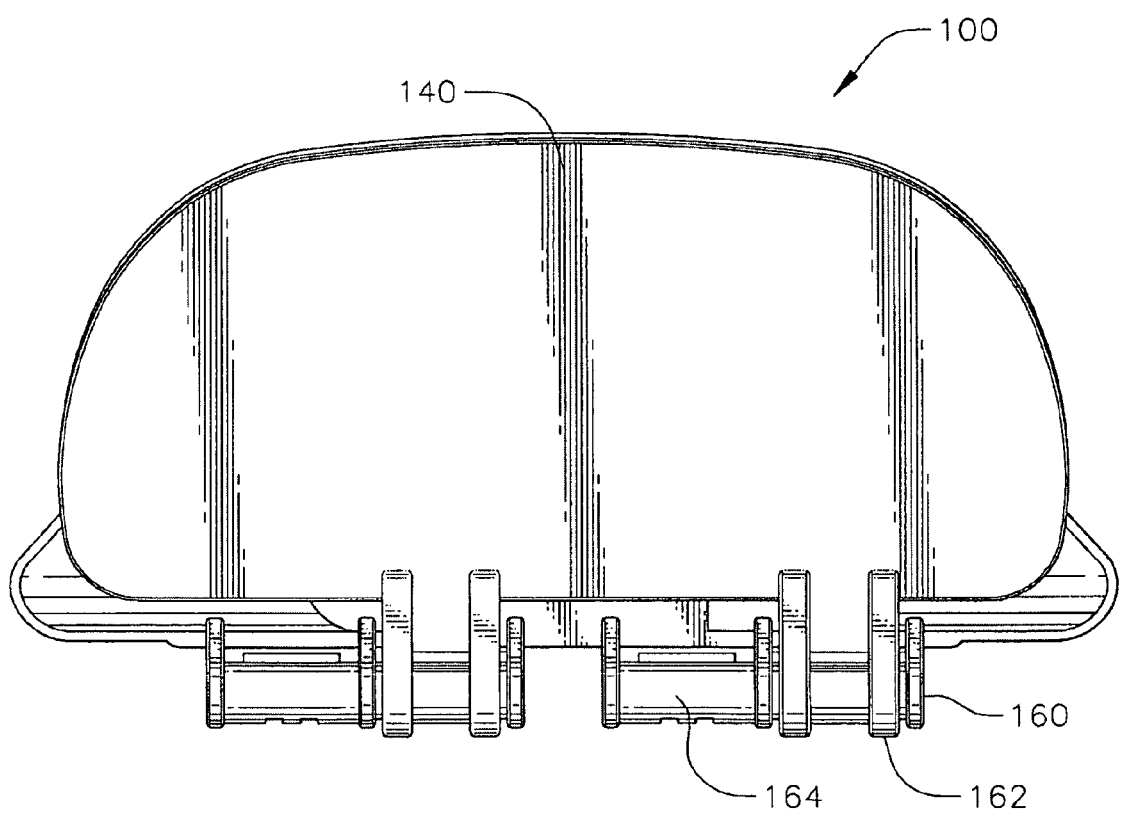
FIG. 5 shows a top view of the photographic light diffuser of FIG. 1.

In one embodiment, as shown in FIGS. 2 and 6, ribs 180 extend along an inner surface of the flap 140. The ribs 180 can also extend along an outer surface of the flap 140. Additionally, ribs 180 may be included on the front panel 110, the left panel 120, and/or the right panel 130. The ribs 180 allow light to be more effectively diffused as it passes through the flap 140 or hood 102 and into the area in which a photograph is being taken.

While this invention has been described in connection with what are considered to be exemplary embodiments, it is to be understood that the invention is not limited to the disclosed embodiments, dimensions, and configurations, but, on the contrary, also extends to various modifications and equivalent arrangements.

What is claimed is:

1. A photographic light diffusing device for mounting to a photographic light source comprising:
    a base for attaching the photographic light diffusing device to the photographic light source, the base comprising a plurality of contact arms;
    a semi-transparent hood extending from the base and defining a top edge, wherein the hood comprises a plurality of panels and is configured to encompass three sides of the photographic light source, and to protrude past an edge of the photographic light source in a direction in which light is emitted from the photographic light source; and
    a flap hinged to the top edge of the hood and rotatable with respect to the hood.

2. The photographic light diffusing device of claim 1 further comprising a strap configured to extend around the contact arms and the photographic light source.

3. The photographic light diffusing device of claim 2, wherein each of the plurality of contact arms further comprises a loop for holding the strap.

4. The photographic light diffusing device of claim 1, wherein the flap is removable.

5. The photographic light diffusing device of claim 1, further comprising a plurality of interchangeable flaps each configured to be hinged to the top edge of the hood, each of the plurality of interchangeable flaps having a different shade, texture and/or shape.

6. The photographic light diffusing device of claim 1, wherein the flap includes a reflective surface.

7. The photographic light diffusing device of claim 1, wherein the flap is configured to fold against one of the panels such that the photographic light diffusing device may be folded into a generally flat position.

8. The photographic light diffusing device of claim 7, wherein at least one of the panels is generally trapezoidal.

9. The photographic light diffusing device of claim 1, wherein the hood defines a plurality of integral ribs.

10. The photographic light diffusing device of claim 1, wherein the flap defines a plurality of integral ribs.

11. A photographic light diffusing device for mounting to a photographic light source comprising:
    a generally rectangular base comprising a plurality of contact arms each adapted to contact the photographic light source;
    a semi-transparent hood defining a front panel, a pair of side panels and a top edge, wherein the hood is configured to protrude past an edge of the photographic light source in a direction in which light is emitted from the photographic light source;
    a flap hinged to the top edge of the hood; and
    a strap configured to extend around the contact arms and the photographic light source to secure the hood to the camera flash.

12. The photographic light diffusing device of claim 11, wherein each contact arm further comprises a loop for holding the strap.

13. The photographic light diffusing device of claim 11, wherein the flap is removable.

14. The photographic light diffusing device of claim 11, further comprising a plurality of interchangeable flaps each configured to be hinged to the top edge of the hood, each of the plurality of interchangeable flaps having a different shade, texture and/or shape.

15. The photographic light diffusing device of claim 11, wherein the flap includes a reflective surface.

16. The photographic light diffusing device of claim 11, wherein the flap is configured to fold against the front panel such that the photographic light diffusing device may be folded into a generally flat position.

17. The photographic light diffusing device of claim 11, wherein the hood defines a plurality of integral ribs.

18. The photographic light diffusing device of claim 11, wherein the flap defines a plurality of integral ribs.

* * * * *